United States Patent Office 3,017,437
Patented Jan. 16, 1962

3,017,437
PRODUCTION OF GLYCOL MONOETHERS
Henri Normant, Paris, France, assignor to Société des Usines Chimiques Rhone-Poulenc, a French body corporate, Paris, France
No Drawing. Filed Oct. 11, 1957, Ser. No. 689,498
Claims priority, application France Nov. 27, 1956
2 Claims. (Cl. 260—611)

This invention relates to a process for the preparation of monoalkyl ethers of secondary-secondary and secondary-tertiary gylcols of the general Formula I:

$$R-\underset{\underset{R_1}{|}}{\overset{\overset{OH}{|}}{C}}-\underset{\underset{R_2}{|}}{\overset{\overset{OR_3}{|}}{CH}} \quad (I)$$

in which R is a saturated or unsaturated aliphatic, aromatic, cycloaliphatic or heterocyclic group, and $R_1$ is a hydrogen atom or a saturated or unsaturated aliphatic, aromatic, cycloaliphatic or heterocyclic group, or R and $R_1$ form a ring with the carbon atom to which they are attached, and $R_2$ and $R_3$ are aliphatic groups.

It is known to prepare secondary-tertiary monoalkyl ethers of this type by reacting organomagnesium derivatives with α-alkoxy ketones or α-alkoxy esters, but the methods of preparation of the initial materials are complicated.

According to the present invention, compounds of Formula I are prepared by condensing an α-chloroalkyl ether of the general Formula II $$R_2-CHCl-O-R_3 \quad (II)$$

with an aldehyde or ketone of the general Formula III $$R-CO-R_1 \quad (III)$$

in the presence of magnesium. Monalkyl ethers of secondary-secondary and secondary-tertiary glycols of general Formula I can thus be obtained in good yields.

This reaction may be represented by the following equation:

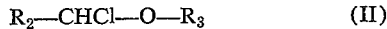

$$R-CO-R_1+R_2.CHCl.O.R_3+Mg \xrightarrow{(+H_2O)}$$

$$R-\underset{\underset{R_1}{|}}{\overset{\overset{OH}{|}}{C}}-\underset{\underset{R_2}{|}}{\overset{\overset{OR_3}{|}}{CH}} \quad (+MgClOH)$$

The glycol ethers obtained by the process of the present invention are of great technical interest because they can readily be transformed by the action of acids into ketones as follows:

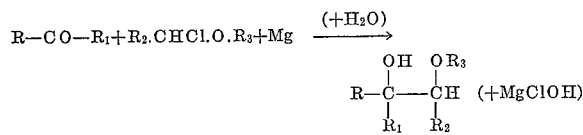

$$R-\underset{\underset{R_1}{|}}{\overset{\overset{OH}{|}}{C}}-\underset{\underset{R_2}{|}}{\overset{\overset{OR_3}{|}}{CH}} \longrightarrow R-CH-CO-R_2$$
$$\phantom{R-C-CH \longrightarrow} R_1$$

This method therefore makes it possible to obtain ketones containing $n+m$ carbon atoms from aldehydes or ketones containing $n$ carbon atoms by condensation with chloroalkyl ethers, the chloroalkyl radical of which contains $m$ carbon atoms.

In the α-chloroalkyl ethers used for the process, $R_3$ is preferably an alkyl radical, advantageously containing at most 4 carbon atoms, such as methyl or ethyl, and $R_2$ is a straight chain or branched chain aliphatic group, for example methyl, ethyl, propyl or isopropyl. The α-chloroalkyl ethers are readily prepared by reacting aldehydes of the formula $R_2$—CHO with hydrochloric acid and an alcohol of the formula $R_3$OH.

Any saturated or unsaturated aliphatic, aromatic or heterocyclic aldehyde or any aliphatic or cyclic ketone may be employed.

The reaction is preferably carried out by bringing the α-chloroalkyl ether and the aldehyde or ketone into contact with magnesium in the presence of a cyclic ether such as tetrahydrofuran, tetrahydropyran and their homologues. The magnesium may be activated by mercuric chloride.

The following example will serve to illustrate the invention:

*Example*

32 g. of freshly distilled α-chloroethylethyl ether are introduced into a spherical flask and diluted with 2 volumes of dry tetrahydrofuran. A third of this solution is poured onto 7.3 g. of magnesium and about 0.5 g. of mercuric chloride just covered by tetrahydrofuran.

On agitation, the reaction commences immediately. The flask is therefore promptly cooled in a bath of crushed ice. The remainder of the solution is slowly added. 17 g. of 2-heptanone diluted with an equal volume of tetrahydrofuran are thereafter added over a period of 1 hour. The agitation is continued for 12 hours and the mixture is allowed to return slowly to ambient temperature.

The magnesium compound obtained in hydrolysed with ice and ammonium chloride, the aqueous layer is extracted with ether and the product is dried over sodium sulphate.

On distillation at 90–94° C. under 12 mm. Hg, 3-methyl-2-ethoxy-3-octanol is obtained in a yield of 50%.

On treatment with formic acid, 3-methyl-2-octanone is obtained in a yield of 75%.

In the following table are indicated the yields obtained on condensation of chloroethyl-, chloropropyl-, chlorobutyl- and chloroisobutylethyl ethers with a series of aldehydes and ketones, and the boiling points of the ethyl ethers of the glycols obtained

|  | Glycol ethers ||
|---|---|---|
|  | Yield, percent | B.P./pressure, mm. |
| α-chloroethylethyl ether with: |  |  |
| heptanal | 60 | 107° C./12 |
| benzaldehyde | 42 | 121–122° C./12 |
| isopropylbenzaldehyde | 70 | 105–106° C./0.4 |
| acrolein | 40 | 61–64° C./20 |
| crotonal | 58 | 79° C./18 |
| isobutyl-methyl-ketone | 50 | 71° C./11 |
| amyl-methyl ketone | 50 | 92° C./12 |
| cyclohexanone | 50 | 93° C./12 |
| α-chloropropylethyl ether with: |  |  |
| heptanal | 66 | 127° C./19 |
| acrolein | 38 | 72–73° C./17 |
| crotonal | 55 | 87° C./17 |
| benzaldehyde | 58 | 93–94° C./0.5 |
| acetone | 46 | 64–66° C./19 |
| isobutylmethyl ketone | 75 | 91° C./17 |
| α-chlorobutylethyl ether with heptanal | 25 | 122–124° C./18 |
| α-chloroisobutylethyl ether with heptanal | 25 | 113–116° C./17 |

I claim:
1. A process for the production of a glycol ether of the general formula

$$R-\underset{\underset{R_1}{|}}{\overset{\overset{OH}{|}}{C}}-\underset{\underset{R_2}{|}}{\overset{\overset{OR_3}{|}}{CH}}$$

where R is selected from the class which consists of aryl groups, saturated and unsaturated aliphatic hydrocarbon groups, saturated and unsaturated cycloaliphatic hydrocarbon groups and groups which with $R_1$ and the carbon atom to which it is attached complete a cycloalkane ring, $R_1$ is selected from the class which consists of hydrogen atoms, and alkyl groups, $R_2$ is an alkyl group and $R_3$ is an alkyl group, provided that when $R_1$ is alkyl R is also alkyl, which comprises producing contact between a compound of the general formula $R.CO.R_1$ and the magnesium derivative of a compound of the general formula $R_2.CHCl.O.R_3$ at a temperature which is at highest in the neighborhood of room temperature and in a liquid cyclic ether selected from the class which consists of tetrahydrofuran and tetrahydropyran as reaction medium, and hydrolyzing the magnesium carbinolate so obtained.

2. Process according to claim 1, wherein the reaction is effected in tetrahydrofuran as the reaction medium.

References Cited in the file of this patent

UNITED STATES PATENTS

| | | |
|---|---|---|
| 2,422,957 | Elderfield et al. | June 24, 1947 |
| 2,555,950 | Wilson | June 5, 1951 |

OTHER REFERENCES

Sommelet: Chem. Abstracts, vol. 1 (1907), 984 (1 page).

Lewis et al.: Jour. Amer. Chem. Soc., vol. 74 (1952), 1253–57 (5 pages).